United States Patent [19]
Jennings et al.

[11] 3,816,731
[45] June 11, 1974

[54] CONVERSION APPARATUS UTILIZED WITH AN ELECTRONIC CALCULATOR

[75] Inventors: Rodney L. Jennings, Saratoga; Rodney J. Teets; Perry L. Kerby, both of San Jose, all of Calif.

[73] Assignee: Rodney L. Jennings, Saratoga, Calif. ; by said Teets, Kerby & Moss

[22] Filed: Feb. 20, 1973

[21] Appl. No.: 333,982

[52] U.S. Cl. ..... 235/156
[51] Int. Cl. ..... G06f 7/48
[58] Field of Search ..... 235/156, 159, 160, 164

[56] References Cited

UNITED STATES PATENTS 3,654,449 4/1972 Boyce ..... 235/156
3,715,746 2/1973 Hatano ..... 340/365 S

*Primary Examiner*—Malcolm A. Morrison
*Assistant Examiner*—David H. Malzahn
*Attorney, Agent, or Firm*—Jack M. Wiseman

[57] ABSTRACT

The apparatus of the present invention comprises a conversion circuit used in combination with a conventional electronic calculator for converting distance in units in one system to an equivalent distance in units in another system. Also, the conversion circuit converts the magnitude of an angle to the magnitude of its complementary angle. More specifically, the conversion circuit converts nautical miles to statute miles, statute miles to nautical miles, and the degrees of an angle to the degrees of its complementary angle. The conversion circuit supplies input signals to the arithmetic circuit of the calculator, which signals are equivalent to key input signals from the calculator's input switch matrix. The number to be converted is first entered on the calculator's keyboard and then an appropriate switch corresponding to the desired conversion is closed. The input signals to the arithmetic circuit of the calculator are generated by a logic circuit which is responsive to the closure of one of the conversion selection switches. A sequencer circuit controls the logic circuit to supply the desired signals corresponding to either an arithmetic function or a numeral in proper sequence to the calculator. An angle detector circuit determines the magnitude of the angle entered in degrees on the calculator's keyboard. If it is less than 180°, the logic circuit effectively enters an addition function and then 180°. If it is 180° or more, the logic circuit effectively enters a subtraction function and then 180°. The conversion between statute miles and nautical miles is performed by either multiplying or dividing by a factor of 0.87. Each cycle is automatically terminated after the logic circuit enters a signal corresponding to an equal sign into the arithmetic circuit of the calculator.

7 Claims, 5 Drawing Figures

PATENTED JUN 11 1974 3,816,731

SHEET 1 OF 3

CONVERSION APPARATUS UTILIZED WITH AN ELECTRONIC CALCULATOR

FIELD OF THE INVENTION

This invention relates generally to electronic conversion apparatus and more particularly to a circuit for converting a numerical representation in units in one system to an equivalent numerical representation in units in another system or converting the magnitude of an angle to the magnitude of its complementary angle.

BACKGROUND OF THE INVENTION

In the practice of many professions, hobbies, and the like, it is often necessary to convert a number from units in one system to an equivalent number in units in another system. In navigation, for example, it is necessary to rapidly and accurately perform mathematical computations which require the conversion of a number. Heretofore, no rapid and accurate means has been available for solving mathematical problems relating to time, distance, fuel management, speed, ascent rates, descent rates, and the like when the conversion of a number is necessary.

A similar problem is also prevalent in other endeavors. For example, it is often necessary for one dealing in foreign exchange rates to convert from one monetary unit to another many times during the course of a business day. The same type of problem is also encountered when it is necessary for one to perform mathematical computations which involve the repeated use of a constant for either multiplying or dividing with another number. In each of these and other comparable instances, it has been the practice in the past to perform the conversion by means of pencil and paper, slide rule, or calculator. The use of any one of those methods, however, requires a plurality of steps, thereby consuming considerable time and greatly increasing the probability of error.

It can be readily appreciated that the use of pencil and paper to perform mathematical computations is considerably more time consuming and susceptible to error than that involved in using either a slide rule or a calculator. A slide rule, on the other hand, is generally considered to be accurate to only the first three most significant digits. Furthermore, the possibility of error while using a slide rule to perform mathematical computations is relatively high, particularly for one not skilled in its use. One of the most serious difficulties encountered in the use of a slide rule is that of determining the position of the decimal point in the resultant answer.

These problems are not completely eliminated by the use of a calculator, since there is a probability that an error will be made in entering information therein. For example, in performing a multiplication operation, one must first enter one of the numbers serially, then enter a multiplication sign, then enter the second number serially, and finally enter an equal sign by way of the keyboard on the calculator. If an error is made in any one of the entries an error will obviously appear unknowingly in the resultant answer.

SUMMARY OF THE INVENTION

Accordingly, it is a primary object of the present invention to provide a conversion circuit which permits a mathematical computation to be performed in a minimum amount of time and with a minimum probability of error.

Another object of the present invention is to provide a conversion circuit which permits relatively rapid conversion between nautical and statute miles and the conversion of an angle to its complementary angle for use by navigators.

These and other objects of the present invention are attained by a circuit which is responsive to the closure of one of a plurality of function select switches to provide a plurality of input signals in sequence into the arithmetic circuit of a conventional calculator. More particularly, the circuit of the present invention employs a logic circuit which is connected effectively in parallel with the input switch matrix of a standard electronic calculator and provides signals to the arithmetic circuit thereof which are equivalent to the signals provided by the input switch matrix. The logic circuit is enabled by the closure of one of a plurality of function select switches. Furthermore, particular output potentials of the logic circuit are enabled by a sequencer to provide the necessary signals, which correspond to arithmetic functions and numerals to be operated on, in proper sequence to the arithmetic circuit of the calculator.

A feature of the present invention resides in the provision of an angle detector circuit which senses the magnitude of the angle entered into the arithmetic circuit by way of the keyboard of the calculator and supplies an appropriate function signal to the logic circuit of the present invention to perform either an addition or a subtraction to obtain the magnitude of the complementary angle.

Another important feature of the present invention resides in the provision of a sequencer circuit for enabling the output potentials of the logic circuit in proper sequence, which sequencer is responsive to a signal generated by the control circuits of the calculator to provide relatively rapid entry of information into the arithmetic circuit of the calculator.

It can be readily appreciated that the conversion circuit of the present invention, when employed in combination with a conventional electronic calculator, provides relatively rapid performance of an arithmetic operation with a relatively minimum probability of error in the performance of that operation.

These and other objects, features and advantages of the present invention, however, will be more fully realized and understood from the following detailed description, when taken in conjunction with the accompanying drawings, wherein:

BRIEF DESCRIPTION OF THE DRAWINGS

Like reference numerals throughout the various views of the drawings are intended to designate the same components.

DETAILED DESCRIPTION OF THE PREFERRED EMBODIMENT

Figures 1, 2:
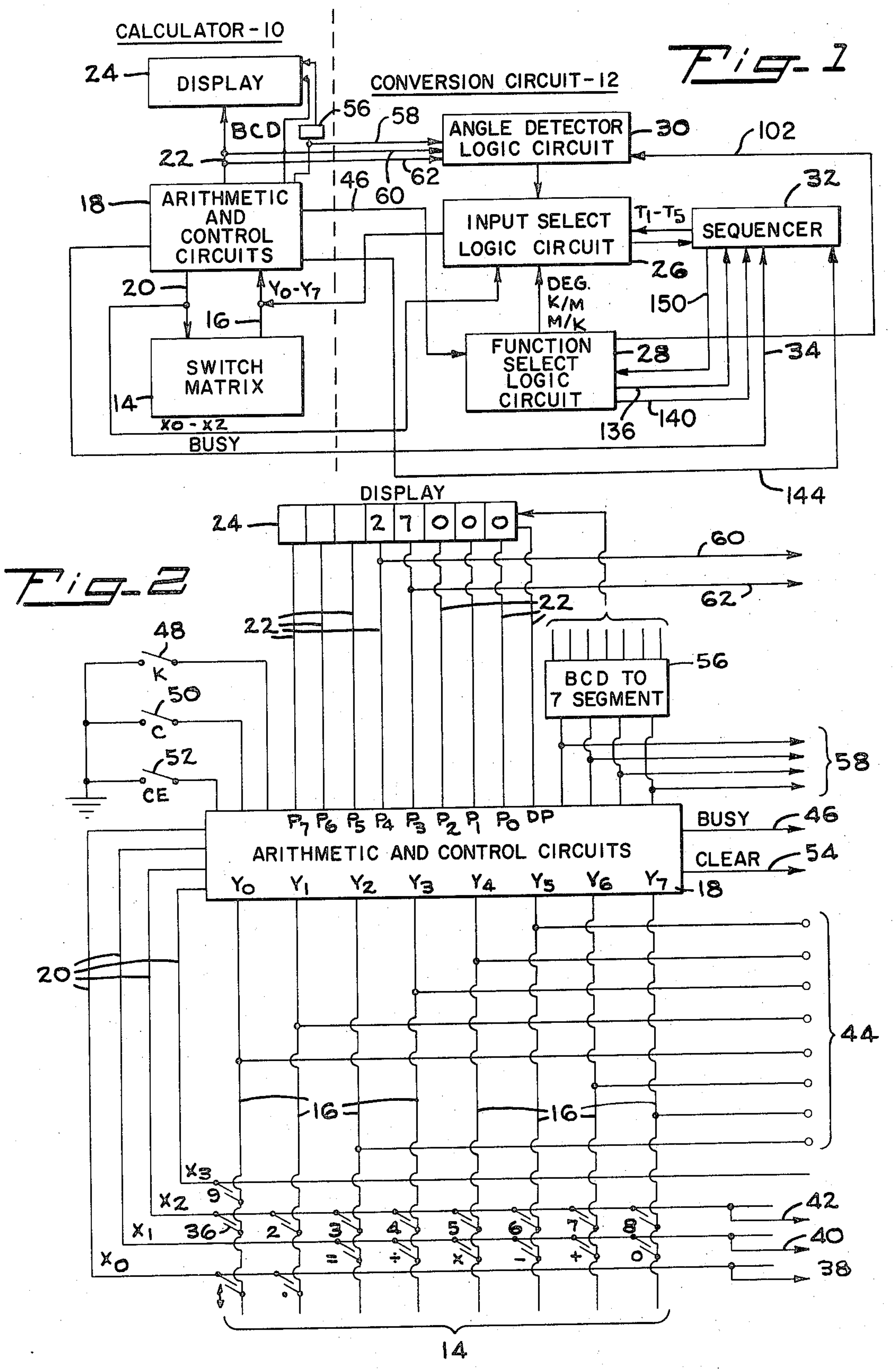
FIG. 1 is a block diagram of a conversion circuit constructed in accordance with the principles of the present invention and illustrated in conjunction with a conventional electronic calculator.
FIG. 2 is a partial block and partial schematic diagram of a conventional electronic calculator employed in combination with the conversion circuit of the present invention, which diagram illustrates the inputs to and outputs from the conversion circuit of the present invention.

With particular reference to FIG. 1, there is shown a conventional electronic calculator designated with the reference numeral 10 and a conversion circuit 12, which is constructed in accordance with principles of the present invention. The calculator 10 illustrated in FIG. 1 is a conventional electronic calculator such as that manufactured and sold by Electronic Arrays, Inc., 501 Ellis Street, Mountain View, Calif., designated as model number EA S-114 and described in their data sheets dated December, 1971. This calculator includes a keyboard having keys for entry of the numerals 0–9, a key for the entry of the decimal point, keys for the entry of arithmetic operations, and keys for clearing and causing an operation to be performed. An input switch matrix 14 includes such a keyboard and supplies signals indicating the closure of a particular keyboard switch by way of a plurality of lines 16 to arithmetic and control circuits 18. The arithmetic and control circuits 18 of the calculator 10 continuously scan the switches of the switch matrix 14 by way of signals transmitted over lines 20. An output from the arithmetic and control circuits 18 is supplied by way of lines 22 to a display 24. The above mentioned data sheets are incorporated herein and reference should be made thereto for a complete understanding of the structure and operation of the calculator 10. It is to be understood, however, that any well-known electronic calculator can be employed for practicing the teachings of the present invention.

Included within the conversion circuit 12 is an input select logic circuit 26 which is effectively connected in parallel with the switch matrix 14 of the calculator 10. That is, input signals are supplied to the logic circuit 26 over the lines 20 and output potentials of the logic circuit 26 are supplied over the lines 16 as input signals to the arithmetic and control circuits 18 of the calculator 10. The logic circuit 26 is partially enabled by a function select circuit 28 which supplies signals corresponding to the particular conversion function to be performed. The logic circuit 26 is also enabled by an angle detector circuit 30 which provides signals corresponding to a particular arithmetic function to be performed when the complement of a particular angle entered into the switch matrix 14 is desired. The angle detector circuit 30 is responsive to certain signals over selected ones of the lines 22 to perform this function. In addition, the logic circuit 26 is enabled by a sequencer 32 which enables particular output signals of the circuit 26 in sequential order for entry into the arithmetic circuit of the calculator 10. The sequencer 32 performs this function in response to a signal supplied over line 34 from the arithmetic control and circuits 18 of the calculator 10.

The particular connections between the calculator 10 and the conversion circuit 12 will be more fully understood from FIG. 2 and the description thereof hereinbelow. In addition, the particular details of the conversion circuit 12 will be more fully understood from FIGS. 3–5 and the description thereof hereinbelow.

The calculator 10 is illustrated in greater detail in FIG. 2, wherein the input switch matrix 14 is shown as including a plurality of switch contacts, one of which is designated with the reference numeral 36. Each switch corresponds to either a numeral, a decimal point, or an arithmetic function to be performed. The particular designations associated with each switch are illustrated on the drawing. Each of the switches in the switch matrix 14 are arranged for connecting one of the lines 20 to one of the lines 16. The lines 20 designated $X_0$–$X_3$ are continuously scanned or energized by the arithmetic and control circuits 18 in the calculator 10 at the rate of 200 KHz, such that when one of the switches 36 is closed, a corresponding one of the lines 16 is also energized. If, for example, the line designated $X_2$ has a signal thereon at a particular time and the switch corresponding to a numeral 2 is closed, the line designated $Y_1$ will provide an input signal to the arithmetic circuit of the calculator 10 corresponding to the numeral 2. The lines designated $X_0$ –$X_2$ are connected by way of lines 38, 40 and 42 to the conversion circuit 12. In addition, the conversion circuit 12 supplies input signal to the arithmetic and control circuits 18 of the calculator 10 over the lines designated with the reference numeral 44, which lines are connected to the lines 16 extending from the switch matrix 14 to the arithmetic and control circuits 18.

When a signal corresponding to a particular numeral or function is being stored or operated on by the arithmetic and control circuits 18, a line 46 has a potential thereon to indicate a "busy" condition. Additional input signals are supplied to the arithmetic and control circuits 18 by way of a plurality of switches 48, 50 and 52. The switch 48, when closed, allows a multiplier or divisor which is entered into the keyboard to be saved for continued use. The switch 50, when closed, causes the calculator 10 to be cleared and initialized for the next sequence of operations. Closure of the switch 52 causes the most recently entered figure to be cleared without disturbing the results of the previous calculation. When the arithmetic and control circuits 18 are cleared, a signal is provided on line 54.

The results of the entries into the arithmetic and control circuits 18 and the operations performed thereby are displayed visually by the display unit 24. Four of the output signals from the arithmetic circuit are BCD encoded signals corresponding to a particular numeral to be displayed in one of the positions of the display 24. These output signals are supplied to a BCD-to-seven segment converter which generates appropriate signals for driving the display 24. Another output signal of the arithmetic circuit, designated DP, provides an appropriate signal for illuminating the decimal point in one of the positions of the display 24. The signals on the remaining output lines, designated $P_0$–$P_7$ energize each of the numerical positions of the display 24 in sequence as appropriate signals are being supplied from the BCD-to-seven segment converter 56. The BCD encoded signals are supplied from the calculator 10 to the conversion circuit 12 by way of the lines designated with the reference numeral 58. In addition, a signal for the energization of the hundreds unit in the display 24 is provided on an output line 60 and a signal for the energization of the tens unit of the display 24 is provided on an output line 62 to the conversion circuit 12.

Figure 3:
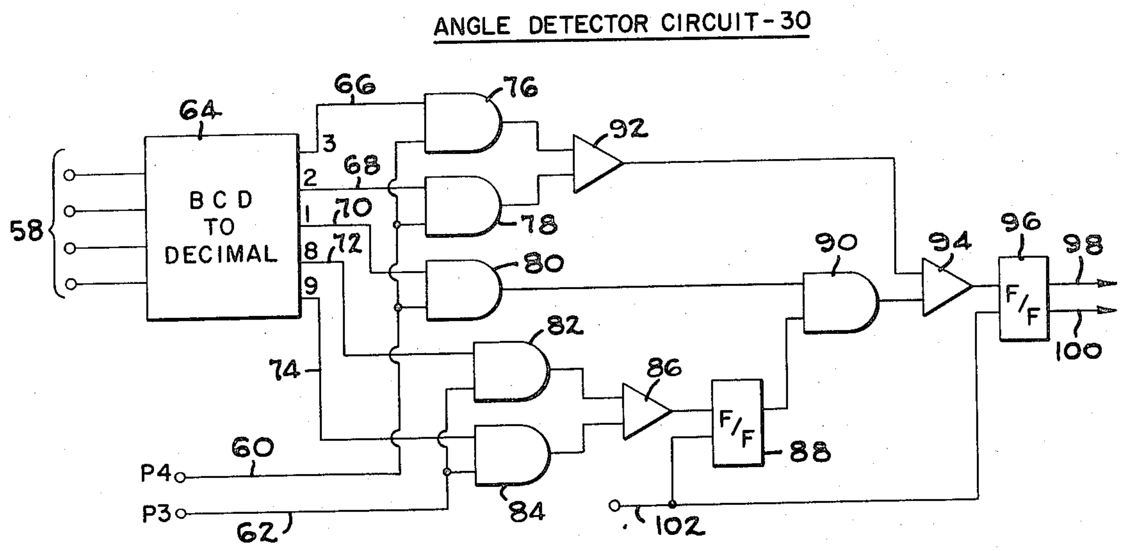
FIG. 3 is a partial block and partial logic diagram of the angle detector logic circuit illustrated in FIG. 1.

The angle detector circuit 30 is illustrated in greater detail in FIG. 3. As shown therein, the BCD encoded information supplied at an output of the arithmetic circuit of the calculator 10 is supplied by way of the lines 58 to a BCD-to-decimal converter 64. When the binary information supplied at an input of the circuit 64 corresponds to a decimal number 3, an output signal is provided on the line 66. An output is provided on line 68 when a decimal numeral 2 is sensed; on a line 70 when a decimal numeral 1 is sensed; on a line 72 when a decimal numeral 8 is sensed; and on a line 74 when a decimal numeral 9 is sensed.

An AND gate 76 has its inputs connected to the lines 66 and 60 and provides an output signal wherever the hundreds unit of the display 24 is energized and the decimal numeral 3 is displayed therein. An AND gate 78 has its two inputs connected to the lines 68 and 60 and provides an output signal whenever the hundreds unit of the display 24 is energized and the decimal numeral 2 is displayed therein. Similarly, and AND gate 80 has its inputs connected to the lines 70 and 60 and provides an output signal whenever the hundreds unit of the display 24 is energized and a decimal numeral 1 is displayed therein.

An AND gate 82 has its inputs connected to the lines 72 and 62 and provides an output signal whenever the tens unit of the display 24 is energized and the decimal numeral 8 is displayed therein. An AND gate 84 has its inputs connected to the lines 74 and 62 and provides an output signal when the tens unit of the display 24 is energized and the decimal numeral 9 is displayed therein. The outputs of the AND gates 82 and 84 are connected through an OR gate 86 to the set input of a flip-flop circuit 88. Accordingly, the flip-flop circuit 88 is set whenever the tens unit of the display 24 is energized and either a decimal numeral 8 or a decimal numeral 9 is displayed therein. An AND gate 90 has its input connected to the output of the AND gate 80 and to the output of the flip-flop circuit 88 and provides an output signal whenever the hundreds unit of the display 24 is energized and a decimal numeral 1 is indicated therein and when the tens unit of the display 24 is energized and either a decimal numeral 8 or a decimal numeral 9 is displayed therein. Accordingly, an output signal from the AND gate 90 corresponds to the entry by way of the switch matrix 14 and the display of a number which is equal to or greater than 180 and less than 200.

The outputs of the AND gates 76 and 78 are connected to respective inputs of an OR gate 92 which provides an output signal whenever the hundreds unit of the display 24 is energized and either a decimal numeral 2 or a decimal numeral 3 is displayed therein. Accordingly, an output signal will be provided from the OR gate 92 whenever a number is entered by way of the matrix 14 and is being displayed which is equal to or greater than 200 and less than 400.

Since the angle detector circuit 30 is only effective to convert an angle entered by way of the switch matrix 14 into its complementary angle, the maximum magnitude of the number entered and displayed will not exceed 360. An output of the AND gate 90 is connected to one input of an OR gate 94 and an output of the OR gate 92 is connected to the other input of the OR gate 94, such that an output signal will be provided therefrom whenever the magnitude of the angle entered by way of the matrix 14 and displayed is equal to or greater than 180°. An output of the OR gate 94 is connected to the set input of a flip-flop circuit 96. Whenever the flip-flop circuit 96 is set, an output signal will be provided on a line 98 indicating that the magnitude of the angle entered into the calculator 10 is equal to or greater than 180°. When the flip-flop circuit 96 is reset, an output signal will be provided on a line 100 which indicates that the angle entered into the calculator 10 by way of the matrix 14 is less than 180°. The flip-flop circuits 88 and 96 are reset by a signal supplied over a line 102, which signal is generated by the function select logic circuit 28, as will be explained in greater detail hereinbelow. The outputs of the flip-flop circuit 96 are employed by the input select logic circuit 26 as will also be explained in greater detail hereinbelow.

Figure 4:
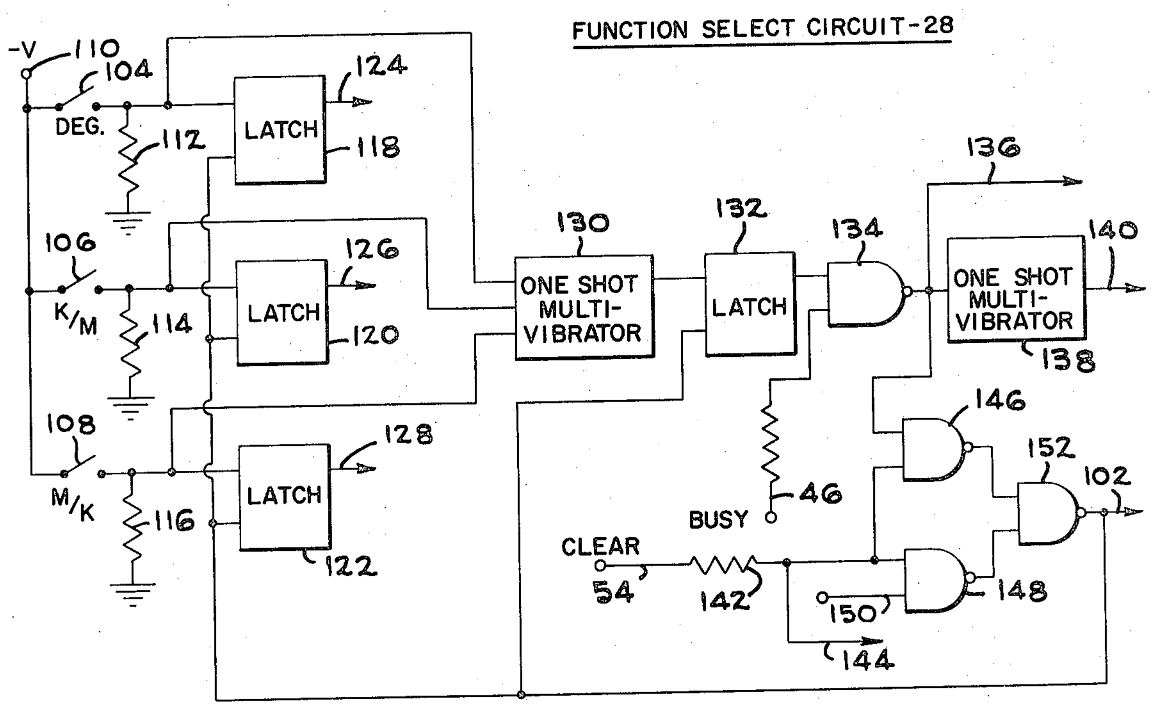
FIG. 4 is a partial block and partial logic diagram of the function select logic circuit illustrated in FIG. 1.

The function select logic circuit 28 is illustrated in greater detail in FIG. 4. As shown therein, a plurality of manually actuated switches 104, 106 and 108 are connected in parallel with one another between a source of negative voltage on a terminal 110 and ground potential via a plurality of resistors 112, 114 and 116, respectively. Closure of one of the switches 104, 106 and 108 enables the logic circuit 26 to operate in one of three conversion modes. More particularly, closure of the switch 104 conditions the logic circuit 26 to supply appropriate input signals to the arithmetic and control circuits of the calculator 10 to generate a complement of an angle entered into the switch matrix 14. Closure of the switch 106 enables the logic circuit 26 to cause an arithmetic conversion of the number entered into the matrix 14 from nautical miles to statute miles. Closure of the switch 108 enables the logic circuit 26 to cause an arithmetic conversion of a number entered into the matrix 14 from statute miles to nautical miles. Closure of one of the switches 104, 106 and 108 sets a corresponding one of the latches 118, 120 and 122, respectively, thereby providing an output on one of the lines 124, 126 and 128 which are employed by the logic circuit 26 as will be explained in greater detail hereinbelow.

Each of the switches 104, 106 and 108 is connected to the input of a one shot multivibrator 130 having its output connected to the set input of a latch 132. An output of the latch 132 is connected to one input of a NAND gate 134, such that it is enabled when the latch 132 is set. The "busy" signal generated as an output signal of the arithmetic and control circuits 18 on the line 46 is supplied to the other input of the NAND gate 134. An output signal of the NAND gate 134 is supplied to the sequencer 32 by way of a line 136. Accordingly, when the latch 132 is set, a signal will be provided on the line 136 corresponding to the "busy" signal generated at an output of the arithmetic and control circuits 18. An output of the NAND gate 134 is also connected to the input of a one shot multivibrator 138 having its output supplied to the sequencer 32 via a line 140.

The "clear" signal generated by the arithmetic and control circuits 18 on the line 54 is applied through a resistor 142 to the sequencer 32 via a line 144. In addition, this signal is connected to one input of each of the NAND gates 146 and 148. The "busy" signal generated at an output of the NAND gate 134 is applied to the other input of the NAND gate 146. An output of the sequencer 32, which is generated when it has completed a complete cycle of operation, is connected by way of a line 150 to the other input of the NAND gate 148. The outputs of the NAND gates 146 and 148 are connected to respective inputs of a NAND gate 152, such that an output signal is generated therefrom after the sequencer 32 has completed a complete cycle of operation, the arithmetic and control circuits 18 are not busy, and a "clear" signal is generated by the arithmetic and control circuits 18. Such an output is provided to each of the latches 118, 120, 122 and 132 to reset the same and is also provided on an output line 102 to reset the flip-flop circuits 88 and 96 of the angle detector circuit 30 (see FIG. 3).

Figure 5:
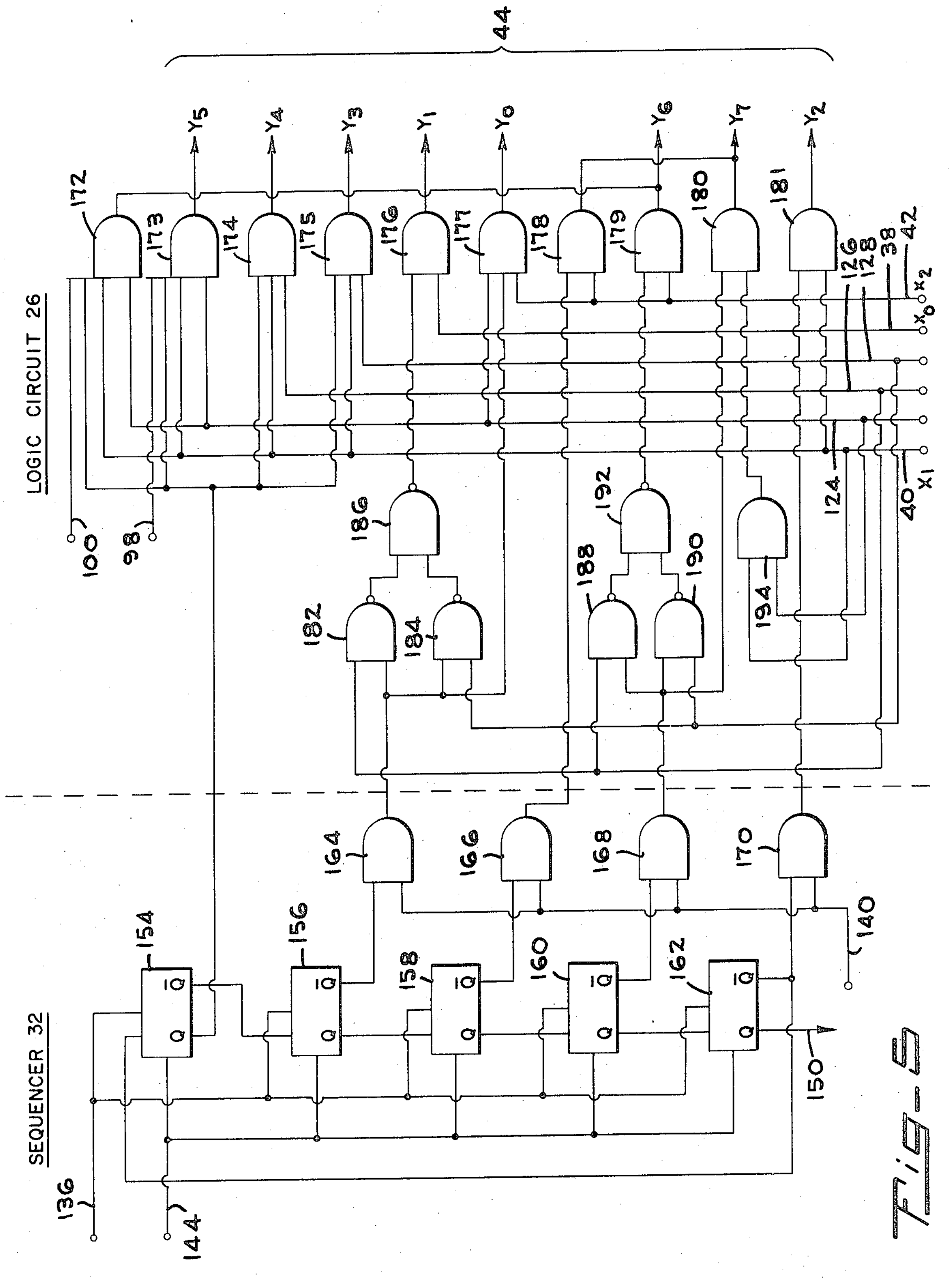
FIG. 5 is a logic diagram of the sequencer and input select logic circuits illustrated in FIG. 1.

The sequencer 32 and logic circuit 26 are illustrated in greater detail in FIG. 5. As shown therein, five flip-flop circuits 154, 156, 158, 160 and 162 are connected together to form a shift register. The line 136 supplies the "busy" signal to the clock input of each of the flip-flop circuits 154–162. Accordingly, each time a pulse is produced by the "busy" signal on the line 46 (FIG. 4) and the latch 132 is set, the flip-flop circuits 154–162 will be clocked. Accordingly, only one output from all of the flip-flop circuits 154–162 will apply an operating potential at a particular time and with each successive pulse of the "busy" signal, the output of a successive flip-flop circuit will have an operating potential thereon. The "clear" signal on the line 144 is also supplied to each of the flip-flop circuits 154–162 to clear the sequencer 32 when the calculator 10 is being cleared. An output signal from each of the flip-flop circuits 156, 158, 160 and 162 is delayed by connecting each output to one input of AND gates 164, 166, 168 and 170, respectively, with the other input of each of the AND gates 164, 166, 168 and 170 being enabled by an output signal of the one shot multivibrator 138 which is applied to the line 140. This delay is employed to enable the previous operation to be completed.

An output signal of the flip-flop circuit 154 and output signals of the AND gates 164–170 are supplied to the logic circuit 26. In addition, the two output signals of the angle detector circuit 30 applied to the lines 98 and 100 are advanced to the logic circuit 26. As shown in the lower right-hand corner of FIG. 5, the lines 38, 40 and 42 (FIG. 2) supply input signals and lines 124, 126 and 128 (FIG. 4) supply additional input signals to the logic circuit 26. Output signals are generated from the logic circuit 26 by means of AND gates 172–181 on lines 44 which are supplied to the arithmetic and control circuits 18 (FIG. 2).

The sequencer 32 effectively divides a complete operating cycle into five time periods. An output of the flip-flop circuit 154 is connected to one input of each and the AND gates 172, 173, 174 and 175, such that these gates will be enabled during a first time period in a complete cycle of operation. An output of the AND gate 164 is connected through NAND gates 182, 184 and 186 to one input of the AND gate 176 and directly to one input of the AND gate 177, such that these gates will be enabled during a second time period. An output of the NAND gate 166 is connected to one input of the AND gate 178, such that it will be enabled during a third time period. An output of the AND gate 168 is connected through NAND gates 188, 190 and 192 to one input of the AND gate 179 and directly to one input of the AND gate 180, such that these gates will be enabled during a fourth time period. An output of the AND gate 170 is connected to one input of the AND gate 181, such that it is enabled during a fifth time period.

A second input signal to the AND gate 172 is provided from an output of the flip-flop circuit 96 over the line 100 and a second input signal to the AND gate 173 is provided from an output of the flip-flop circuit 96 over the line 98. A third input signal to each of the AND gates 172 and 173 is applied over the line 40 and a fourth input signal to the AND gates 172 and 173 is applied over the line 124. Accordingly, when a number corresponding to the magnitude of an angle is entered by way of the switch matrix 14 into the calculator 10 which is less than 180°, and it is desired to find the complement of that angle, an output signal will be provided from the AND gate 172 during a first time period which will be applied to one of the lines 44 designated $Y_6$. Since the AND gate 172 is enabled when the line 40 ($X_1$) has a signal thereon, an addition function signal will be supplied to the arithmetic and control circuits 18 of the calculator 10. If, however, the line 98 has a signal thereon, an output signal will be provided from the AND gate 173 to apply a signal to one of the lines 44 designated $Y_5$ and a signal corresponding to a subtraction function will be supplied to the arithmetic and control circuits of the calculator 10.

As previously mentioned, a signal is applied to one input of each of the AND gates 174 and 175 during the first time period. Accordingly, one of these gates will provide an output to an appropriate one of the lines 44 when the other two inputs of each of these gates are supplied with an appropriate signal. A second input of each of the AND gates 174 and 175 is supplied with a signal over the line 40. A third input of the AND gate 174 is supplied with a signal over the line 126, which signal is generated by closure of the switch 106. Accordingly, if the switch 106 is closed and the line 40 has a potential thereon, the AND gate 174 will supply an output on one of the lines 44 designated $Y_4$ during the first time period. When the line 40 has a potential thereon and the line 44 designated $Y_4$ has a potential thereon, a multiplication function will be supplied to the arithmetic circuit of the calculator 10. A third input of the AND gate 175 is supplied with a signal over the line 128, which signal is generated by closure of the switch 108. Accordingly, if the switch 108 is closed and the line 40 has a potential thereon, the AND gate 175 will supply an output on one of the lines 44 designated $Y_3$ during the first time period. When the line 40 has a potential thereon and the line 44 designated $Y_3$ has a potential thereon, a division function will be supplied to the arithmetic circuit of the calculator 10.

When it is desired to convert from nautical miles to statute miles, the switch 106 is closed, thereby providing a signal by way of the line 126 to the NAND gate 182. When it is desired to convert from statute miles to nautical miles the switch 108 is closed, thereby providing a signal by way of the line 128 to an input of the NAND gate 184. Output signals of the NAND gates 182 and 184 are applied to respective inputs of the NAND gate 186, such that an output signal will be provided therefrom during the second time period of the cycle of operation of the sequencer 32 and when one of the switches 107 or 108 is closed. Such an output signal is applied to one input of the AND gate 176, which has its other input connected to the line 38. An output of the AND gate 176 is connected to one of the lines 44 designated $Y_1$ and supplies a signal to the arithmetic circuit of the calculator 10 corresponding to a decimal point. If the switch 104 is closed to convert from an angle to its complementary angle, the AND gate 177 will provide an output signal during the second time period when a potential is applied to the line 42. An output signal from the AND gate 177 will be applied to one of the lines 44 designated $Y_0$ to supply a signal to the arithmetic and control circuits 18 of the calculator 10 corresponding to the numeral 1.

During the third time period in a complete cycle of operation of the sequencer 32, the AND gate 178 is enabled by virtue of the connection of one of its inputs to the output of the AND gate 166. When the line 42, which is connected to the other input of the AND gate 178, has a potential thereon, an output signal will be applied to one of the lines 44 designated $Y_7$ to supply a signal corresponding to a numeral 8 to the arithmetic circuit of the calculator 10. Accordingly, the closure of any one of these switches 104, 106 and 108 will provide such an output signal during the third time period of the cycle of operation of the sequencer 32.

During the fourth time period in the cycle of operation of the sequencer 32, one of the AND gates 179 or 180 will apply an output signal to the arithmetic circuit of the calculator 10. An output of the AND gate 168 is connected to one input of each of the NAND gates 188 and 190. The line 126 is connected to a second input of the NAND gate 190. Outputs of the NAND gates 188 and 190 are connected to the respective inputs of the NAND gate 192 having its output connected to one input of the AND gate 179. Accordingly, during the fourth time period of the cycle of operation of the sequencer 32, an output signal will be provided from the NAND gate 192 whenever one of the switches 106 or 108 is closed. When such an output is transmitted and the line 42, which is connected to the other input of the AND gate 179, has a potential thereon, an output signal will be applied from the AND gate 179 to one of the lines 44 designated $Y_6$. Such an output signal will provide an input signal to the arithmetic and control circuits 18 of the calculator 10 corresponding to the numeral 7. If, during the fourth time period, the switch 104 is closed, rather than one of the switches 106 or 108, the AND gate 180 will be enabled. The line 124 which has a potential thereon when the switch 104 is closed is connected to one input of an AND gate 194 having its other input connected to the line 40. An output of the AND gate 194 is connected to one input of the AND gate 180 and an output of the AND gate 168 is connected to the other input of the AND gate 180. Accordingly, when an output signal is provided from the AND gate 180, one of the lines 44 designated $Y_7$ will have a potential thereon to provide an input signal to the arithmetic circuit of the calculator 10 corresponding to the numeral 0.

During the fifth time period of the cycle of operation of the sequencer 32, the AND gate 181 will be enabled by virtue of the connection of one of its inputs to an output of the AND gate 170 and the connection of its other input to the line 40. An output signal from the AND gate 181 is supplied to one of the lines 44 designated $Y_2$ which will supply an input signal to the arithmetic and control circuits 18 of the calculator 10 corresponding to an equal sign.

From the above description, it can be appreciated that when a number corresponding to the magnitude of an angle is entered by way of the switch matrix 14 and the switch 104 is closed, the logic circuit 26 will provide appropriate input signals to the arithmetic and control circuits 18 of the calculator 10 in sequence. Such signals will correspond to either an addition function or a subtraction function, depending upon the particular output signal produced by the angle detector circuit 30; then a numeral 1 during the second time period of the cycle of operation of the sequencer 32; then a numeral 8 during the third time period of the cycle of operation of the sequencer 32; then a numeral 0 during the fourth time period of the cycle of operation of the sequencer 32; and finally an equal sign function during the fifth time period of the sequencer 32. Also, it can be appreciated that during the first time period of the cycle of operation of the sequencer 32 and when one of the switches 106 or 108 is closed, either a multiplication or a division function will be entered into the arithmetic and control circuits 18 of the calculator 10. Furthermore, closure of either of the switches 106 or 108 will provide signals corresponding to a decimal point during the second time period of the cycle of operation of the sequencer 32; a numeral 8 during the third time period of the cycle of operation of the sequencer 32; a numeral 7 during the fourth time period of the cycle of operation of the sequencer 32; and finally an equal sign function during the fifth time period of the cycle of operation of the sequencer 32.

In essence, the logic circuit 26 is connected in parallel with the switch matrix 14 between the lines 20 and 16, such that the arithmetic circuit of the calculator 10 is supplied with additional enable signals corresponding to the particular conversion desired during the time period in which such appropriate signals must be generated. The particular conversion which is to be made is effected by closure of one of the switches 104, 106 and 108. If an angle is to be converted to its complement, the angle detector circuit 30 supplies additional input signals to indicate whether or not the angle entered into the calculator 10 is equal to or greater than 180°.

Although the above described embodiment of the present invention is a conversion circuit which can be employed by navigators and the like, it can be readily appreciated that the principles of the invention can be employed for performing other conversion computations which involve either the addition, subtraction, multiplication, or division of a constant with another number.

We claim:

1. Conversion apparatus including:

A. a calculator comprising:

a. a keyboard, b. an input circuit for generating signals corresponding to numerals to be operated on and functions to be performed as entered on the keyboard, c. an arithmetic circuit responsive to such signals for arithmetically operating on data represented thereby, said arithmetic circuit operating sequentially on each signal applied thereto for generating a busy signal, d. an output circuit responsive to an output of said arithmetic circuit including a display to provide an indication of the result of the arithmetic operation performed therein; and B. a conversion circuit in combination therewith, said conversion circuit comprising:

a. first means for providing a signal corresponding to a conversion function to be performed, b. second means connected to said input circuit and said first means and said arithmetic circuit for entering a signal in said arithmetic circuit corresponding to a numeral to be operated on and entering into said arithmetic circuit a signal corresponding to a conversion function to be performed, c. third means connected to said second means and said arithmetic circuit for controlling the operation of said second means in response to said busy signals from said arithmetic circuit to sequentially enter into said arithmetic circuit through said second means a signal corresponding to a numeral to be operated on and a signal corresponding to the conversion function to be performed.

2. Conversion apparatus as claimed in claim 1, wherein the input circuit of the calculator is an input switch matrix having a plurality of outputs each corresponding to either an arithmetic function to be performed or a numeral to be arithmetically operated on and connected to corresponding inputs of the arithmetic circuit, and wherein said second means of said conversion circuit is connected to said inputs of the arithmetic circuit and said outputs of said input switch matrix.

3. Conversion apparatus as claimed in claim 1, wherein the input circuit of the calculator comprises input switch matrix having a plurality of input lines which have potentials applied thereto in succession by the arithmetic circuit, a plurality of output lines connected to corresponding inputs of the arithmetic circuit, and a plurality of switches each corresponding to either an arithmetic function to be performed or a numeral to be arithmetically operated on and connected to a corresponding one of the input lines, such that the arithmetic circuit senses either a particular function or a particular numeral in accordance with the particular input line which has a potential applied thereto and the particular switch which is closed, and wherein said second means of said conversion circuit is responsive to the potential on a respective one of the input lines of the input circuit and to said third means for providing a corresponding input to said arithmetic circuit.

4. Conversion apparatus as claimed in claim 1 and further comprising means responsive to an output signal of the arithmetic circuit for entering into said second means a conversion function to be performed in accordance with the magnitude of a number entered into the input circuit by way of the keyboard.

5. Conversion apparatus including:

A. a calculator comprising:

a. a keyboard, b. an input circuit for generating signals corresponding to numerals to be operated on and functions to be performed as entered on the keyboard, c. an arithmetic circuit responsive to such signals for arithmetically operating on data represented thereby, d. an output circuit responsive to an output of said arithmetic circuit including a display to provide an indication of the result of the arithmetic operation performed therein; and B. a conversion circuit in combination therewith, said conversion circuit comprising:

a. first means responsive to an output signal of the arithmetic circuit for providing a conversion function to be performed in accordance with the magnitude of a number entered into the input circuit by way of the keyboard, and b. second means connected to said input circuit and said first means and said arithmetic circuit for entering a signal in said arithmetic circuit corresponding to a numeral to be operated on and entering into said arithmetic circuit a signal corresponding to the conversion function to be performed.

6. Conversion apparatus as claimed in claim 5 and further comprising third means in said conversion circuit connected to said second means for controlling the operation of said second means for sequentially advancing to said arithmetic circuit through said second means a signal corresponding to a numeral to be operated on and a signal corresponding to the conversion function to be performed.

7. Conversion apparatus as claimed in claim 6 wherein said arithmetic circuit operates sequentially on each signal applied thereto for generating a busy signal and wherein said third means being connected to said arithmetic circuit for controlling the operation of said second means in response to said busy signals from said arithmetic circuit to sequentially enter to said arithmetic circuit through said second means a signal corresponding to a numeral to be operated on and a signal corresponding to the conversion function to be performed.

* * * * *